(12) United States Patent
Patel (10) Patent No.: US 11,168,731 B2
(45) Date of Patent: Nov. 9, 2021

(54) LOCKWIRELESS ROD ASSEMBLY

(71) Applicant: SPS Technologies, LLC, Jenkintown, PA (US)

(72) Inventor: Nilesh Patel, Irvine, CA (US)

(73) Assignee: SPS Technologies, LLC, Jenkintown, PA (US)

(*) Notice: Subject to any disclaimer, the term of this patent is extended or adjusted under 35 U.S.C. 154(b) by 244 days.

(21) Appl. No.: 16/437,094

(22) Filed: Jun. 11, 2019

(65) Prior Publication Data

US 2020/0392979 A1 Dec. 17, 2020

(51) Int. Cl.
*F16B 39/282* (2006.01)
*F16B 39/24* (2006.01)

(52) U.S. Cl.
CPC ........... *F16B 39/282* (2013.01); *F16B 39/24* (2013.01); *F16C 2226/60* (2013.01)

(58) Field of Classification Search
CPC .......... F16B 39/08; F16B 39/10; F16B 39/12; F16B 39/24; F16B 39/282; F16B 39/32; F16C 2226/60; Y10S 411/924; Y10S 411/948
USPC .................... 411/190, 191, 196–200, 204
See application file for complete search history.

(56) References Cited

U.S. PATENT DOCUMENTS

| | | | |
|---|---|---|---|
| 995,760 A * | 6/1911 | Anderson | F16B 39/108 411/123 |
| 1,302,105 A * | 4/1919 | Warren | F16B 39/14 411/196 |
| 2,141,701 A | 12/1938 | Uherkovich | |
| 2,405,424 A * | 8/1946 | Herreshoff | F16C 9/04 411/220 |
| 2,407,928 A * | 9/1946 | Herreshoff | F16C 9/04 411/366.1 |
| 2,956,604 A * | 10/1960 | Crotty | F16B 39/06 411/322 |
| 4,812,094 A | 3/1989 | Grube | |
| 4,971,501 A | 11/1990 | Chavez | |
| 8,591,157 B1 * | 11/2013 | Stewart | F16B 31/028 411/10 |
| 8,622,671 B2 * | 1/2014 | Gagneur | F16B 39/24 411/123 |

(Continued)

FOREIGN PATENT DOCUMENTS

| | | |
|---|---|---|
| DE | 102004030965 | 2/2006 |
| EP | 2362108 | 8/2011 |

OTHER PUBLICATIONS

European Search Report Issued in Corresponding EP Application No. 20176917, dated Oct. 12, 2020.

*Primary Examiner* — Roberta S Delisle
(74) *Attorney, Agent, or Firm* — Burris Law, PLLC (57) ABSTRACT

A connector assembly includes a first member, a threaded shaft, a nut, a set of first teeth, a set of second teeth, and a tab. The threaded shaft is disposed about an axis. The nut is threadably engaged with the threaded shaft. The nut includes a plurality of radially outward extending protrusions. The first teeth face axially and are non-rotatably coupled to the first member. The second teeth are configured to mate with the first teeth. The second teeth are coupled to the threaded shaft for axial movement relative to the threaded shaft and for common rotation with the threaded shaft. The tab is non-rotatable relative to the first member. The tab engages the protrusions to inhibit rotation of the nut relative to the first member.

20 Claims, 4 Drawing Sheets

(56) References Cited

U.S. PATENT DOCUMENTS

| | | | |
|---|---|---|---|
| 8,777,534 B2 * | 7/2014 | Wallbaum | H01R 13/512 |
| | | | 411/103 |
| 9,022,709 B2 | 5/2015 | Benzing | |
| 9,435,370 B2 * | 9/2016 | Hughes | F16B 39/32 |
| 9,719,550 B2 | 8/2017 | Stewart | |
| 9,841,046 B2 | 12/2017 | Hess et al. | |
| 10,125,807 B2 | 11/2018 | Furu-Szekely et al. | |
| 10,215,217 B2 * | 2/2019 | Hess | A61B 17/7032 |
| 10,323,678 B2 * | 6/2019 | Hess | F16B 39/282 |
| 2009/0103998 A1 | 4/2009 | Gagneur | |
| 2016/0084291 A1 | 3/2016 | Stewart | |

\* cited by examiner

LOCKWIRELESS ROD ASSEMBLY

FIELD

The present disclosure relates to rod assemblies, and more particularly, rod assemblies that lock without lockwires.

BACKGROUND

The statements in this section merely provide background information related to the present disclosure and may not constitute prior art.

Rod assemblies, such as those used in aircraft can include a tube coupled to a clevis by a nut and a threaded rod extending from the clevis. Once the clevis is appropriately positioned relative to the tube, the nut is tightened on the threaded rod to inhibit further movement. In some applications, vibration or other forces can cause the nut to back off or loosen, which can cause the position of the clevis to change from a nominal design position.

To inhibit the nut from rotating after installation, a lockwire is typically inserted through the nut and connected to the tube or a component stationary to the tube. Installing such lockwires adds complexity to the rod assembly and can increase manufacturing time and costs.

The present disclosure addresses these issues with typical lockwire type rod assemblies.

SUMMARY

This section provides a general summary of the disclosure and is not a comprehensive disclosure of its full scope or all of its features.

In one form, a connector assembly includes a first member, a threaded shaft, a nut, a set of first teeth, a set of second teeth, and a tab. The threaded shaft is disposed about an axis. The nut is threadably engaged with the threaded shaft. The nut includes a plurality of radially outward extending protrusions. The first teeth face axially and are non-rotatably coupled to the first member. The second teeth are configured to mate with the first teeth. The second teeth are coupled to the threaded shaft for axial movement relative to the threaded shaft and for common rotation with the threaded shaft. The tab is non-rotatable relative to the first member. The tab engages the protrusions to inhibit rotation of the nut relative to the first member. In a variety of alternate forms of the present disclosure: the first and second teeth form mating crowns that extend circumferentially about the axis; the nut includes a tool engagement portion and a flange that extends radially outward of the tool engagement portion, the protrusions being disposed about the flange; the tab is formed of a resilient material and is biased radially inward to slide along ramp surfaces defined between the protrusions; the ramp surfaces are configured to permit ratcheting of the tab in a tightening direction of the nut while inhibiting the nut from rotating in a loosening direction of the nut; the connector assembly further includes a first ring defining the first teeth and a first engagement surface on a side of the first ring that is opposite the first teeth, the first engagement surface engaging a second engagement surface defined by the first member to inhibit relative rotation between the first ring and the first member; one of the first ring and the first member includes an axial protrusion and the other one of the first ring and the first member defines a notch that receives the axial protrusion to inhibit relative rotation between the first ring and the first member; the connector assembly further includes a second ring defining an aperture, the tab extends axially from the second ring, the axial protrusion extending through the aperture and engaging the aperture to inhibit relative rotation between the first ring and the second ring; the tab extends axially from the first ring; the tab extends axially from the first member; the connector assembly further includes a ring defining the second teeth, the ring being disposed about the threaded shaft and axially between the nut and the first teeth; the ring includes a radial protrusion, the radial protrusion being received within a slot defined by the threaded shaft to inhibit relative rotation between the ring and the threaded shaft while permitting axial movement therebetween; the connector assembly further includes a clevis coupled to an end of the threaded shaft; the first member is a tube extending along the axis.

In another form, a rod assembly includes a tube member, a shaft, a nut, a set of first crown teeth, an first ring, and a tab. The tube member is disposed about an axis. The shaft defines threads disposed about the axis and defines an axial slot. The nut is threadably engaged with the threads of the shaft. The nut includes a plurality of serrations disposed about the axis. The first crown teeth are non-rotatably coupled to the tube member. The first ring is disposed about the shaft axially between the nut and the first crown teeth. The first ring defines a set of second crown teeth configured to mate with the first crown teeth. The first ring includes a protrusion that extends into the axial slot of the shaft to inhibit relative rotation between the first ring and the shaft. The tab is non-rotatable relative to the tube member. The tab engages the serrations to inhibit rotation of the nut relative to the tube member. In a variety of alternate forms of the present disclosure: the rod assembly further includes a second ring defining the first crown teeth, wherein one of the second ring and the tube member includes a protrusion and the other one of the second ring and the tube member defines a notch that receives the protrusion to inhibit relative rotation between the second ring and the tube member; the rod assembly further includes a third ring defining an aperture, the tab extends axially from the third ring, the axial protrusion extending through the aperture and engaging the aperture to inhibit relative rotation between the second ring and the third ring; the tab extends axially from the second ring or the rod member.

In yet another form, a rod assembly includes a tube member, a shaft, a nut, a first ring, a second ring, and a third ring. The tube member is disposed about an axis. The shaft defines threads disposed about the axis and defines a keyway. The nut is threadably engaged with the threads of the shaft. The nut includes a plurality of serrations disposed about the axis. The first ring is disposed about the axis and defines a set of axially facing first teeth. The second ring is disposed about the shaft axially between the nut and the first ring. The second ring defines a set of axially facing second teeth configured to mate with the first teeth. The second ring includes a key that extends into the keyway of the shaft to inhibit relative rotation between the second ring and the shaft. The third ring is coupled to the tube member to be non-rotatable relative to the tube member. The third ring includes a tab that engages the serrations to inhibit rotation of the nut relative to the third ring. One of the first ring and the tube member includes a plurality of protrusions and the other one of the first ring and the tube member defines at least one notch. The protrusions extending into the at least one notch and inhibiting relative rotation between the tube member and the first ring. In one form of the present disclosure, the third ring defines an aperture that receives at least one of the protrusions to inhibit relative rotation between the third ring and the one of the first ring and the tube member.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
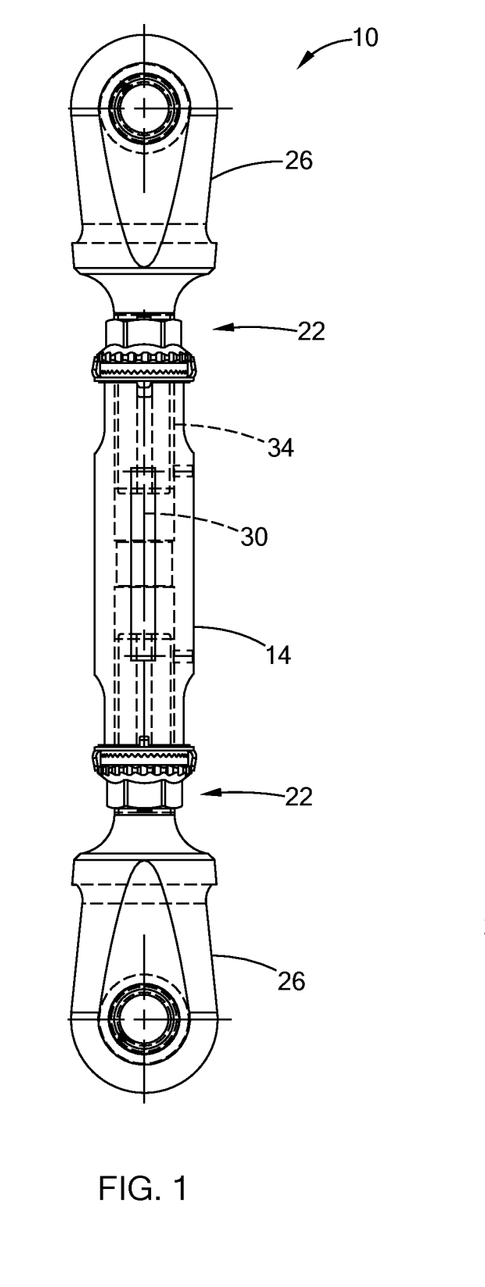
FIG. 1 is a side view of a rod assembly in accordance with the teachings of the present disclosure.
Figure 2:
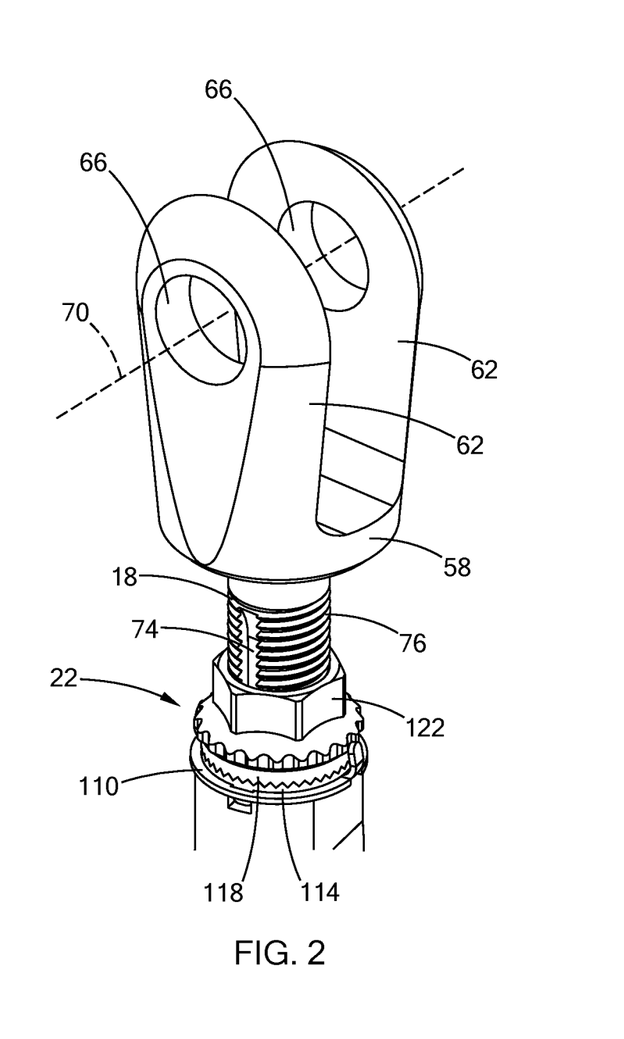
FIG. 2 is a perspective view of a connection of the rod assembly of FIG. 1.

Referring to FIGS. 1 and 2, a rod assembly 10 according to the teachings of the present disclosure is illustrated. The rod assembly 10 includes a first member (e.g., tube 14), a threaded shaft 18, and a connection assembly 22. In the example provided, the rod assembly 10 includes a pair of connection assemblies 22 and each connects a corresponding threaded shaft 18 to opposite ends of the tube 14. The threaded shafts 18, opposite ends of the tube 14, and the connection assemblies 22 are similar. Thus, only one end and the corresponding parts are described herein in detail for purposes of clarity. In the example provided, the rod assembly 10 also includes a pair of clevises 26, as shown in FIG. 1. Each clevis 26 is fixedly coupled to a corresponding one of the threaded shafts 18.

Figure 3:
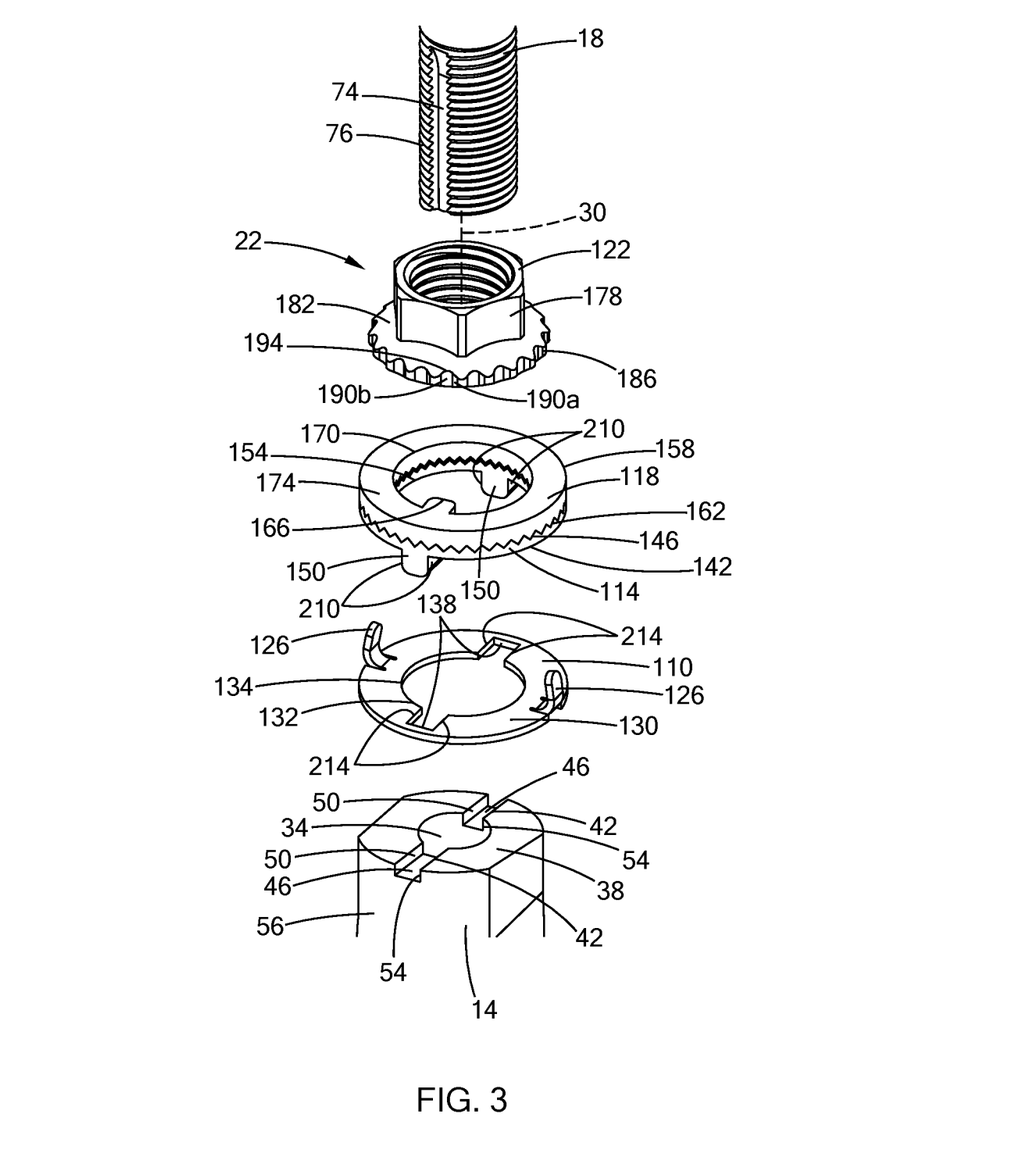
FIG. 3 is an exploded view of a portion of the connection of FIG. 2.

Referring to FIG. 3, the tube 14 is disposed about an axis 30. The end of the tube 14 defines a bore 34 coaxial with the axis 30 and is open through the end of the tube 14, as shown. The bore 34 can extend fully through the tube 14 or can terminate within the tube 14. The bore 34 is internally threaded and configured to threadably mate with the threaded shaft 18 received therein. In the example provided, the end of the tube 14 has an end surface 38 and a notch 42 that is recessed into the end surface 38. As shown, the end surface 38 can be generally perpendicular to the axis 30 in one form of the present disclosure, though other configurations can be used while remaining within the scope of the present disclosure. The notch 42 is defined by a recessed surface 46 and opposing wall surfaces 50, 54. The recessed surface 46 is axially recessed from the end surface 38. The wall surfaces 50, 54 extend axially from the end surface 38 to the recessed surface 46. In the example provided, the notch 42 is open through, or extends through, the perimeter of the tube 14 (e.g., through peripheral wall 56) and is open into the bore 34, though other configurations can be used while remaining within the scope of the present disclosure. In the example provided, the tube 14 defines a second notch 42 that is diametrically opposite the first notch 42. In the example provided, the notches 42 are generally rectangular in shape, though other configurations can be used while remaining within the scope of the present disclosure.

In an alternative construction, not specifically shown, the notch 42 is not open through the perimeter of the tube 14 and/or is not open to the bore 34. In another alternative construction, not specifically shown, the tube 14 can define more than two notches 42 or can define a single notch 42, both of which that could take on a variety of shapes and configurations while providing the function of the notches 42 as described in greater detail below.

Referring to FIGS. 2 and 3, the clevis 26 includes a base 58 and a pair of prongs 62. The prongs 62 extend axially from the base 58 as shown and are spaced apart from each other. Clevis bores 66 extend through both prongs 62 along an axis 70 that, in the example provided, is generally perpendicular to the axis 30. The base 58 is fixedly coupled (e.g., welded) to one end of the threaded shaft 18.

The threaded shaft 18 is disposed about the axis 30 and extends longitudinally along the axis 30. The threaded shaft 18 defines a slot or keyway 74 that extends axially along one side of the threaded shaft 18 and extends radially inward from a perimeter of the threaded shaft 18 (e.g., a peripheral threaded outer wall 76). In the example provided, the keyway 74 extends radially inward a distance that is less than the radius of the threaded shaft 18. The keyway 74 is open through the end of the threaded shaft that is opposite the clevis 26. The keyway 74 is also open through the perimeter of the threaded shaft 18 and interrupts the external threads of the threaded shaft 18. In an alternative construction, not specifically shown, the threaded shaft 18 can include additional keyways spaced about the axis 30, or around its periphery (or peripheral threaded outer wall 76).

The connection assembly 22 includes a lock element 110, a ring 114, a different ring 118, and a nut 122. The lock element 110 includes at least one tab 126. In the example provided, the lock element 110 includes two tabs 126 and a flat ring or washer body 130 that is unitarily formed with the tabs 126, though other configurations can be used. The tabs 126 extend axially from diametrically opposite sides of the washer body 130 and extend near the radial outer perimeter of the washer body 130. The washer body 130 defines an aperture 132. In the example provided, the aperture 132 includes a circular portion 134 coaxial with the axis 30 and two notches 138 that extend radially outward from diametrically opposite sides of the circular portion 134. In one form, the number, shape, and positioning of the notches 138 coincide, or are aligned with the number, shape, and positioning of the notches 42 of the tube 14. In an alternative construction, not specifically shown, one tab 126 or more than two tabs 126 can be used.

The ring 114 includes an annular member 142, a set of teeth 146, and a pair of protrusions 150. The annular member 142 defines a central aperture 154 and is disposed coaxially about the axis 30. The teeth 146 extend axially from one axial end of the annular member 142 so that the teeth 146 are of an axially facing orientation. In the example provided, the teeth 146 are crown teeth that extend about the entire circumference of the annular member 142, though other configurations can be used. The protrusions 150 extend axially from the opposite axial end of the annular member 142. In the example provided, the protrusions 150 are generally rectangular and extend through the notches 138 of the lock element 110 and into the notches 42 of the tube 14 so that the protrusions 150 engage surfaces of the notches 42, 138 to inhibit relative rotation between the ring 114, the lock element 110 and the tube 14. While two protrusions 150 are illustrated disposed on diametrically opposite sides of the annular member 142, the number, shape, and positioning of the protrusions 150 can coincide with that of the notches 42 and 138.

The ring 118 includes an annular member 158, a set of teeth 162, and a protrusion or key 166. The annular member 158 defines a central aperture 170 and is disposed coaxially about the axis 30. The teeth 162 extend axially from one axial end of the annular member 158 so that the teeth 162 are of an orientation that faces axially toward the teeth 146. In the example provided, the teeth 162 are crown teeth that extend about the entire circumference of the annular member 158, though other configurations can be used. The teeth 162 are configured to mesh with the teeth 146 in a manner that can inhibit relative rotation between the rings 114, 118. The key 166 extends radially inward from the annular member 158 into the aperture 170. The key 166 is shaped to be received in the keyway 74 of the threaded shaft 18 so that the key 166 engages surfaces of the keyway 74 to inhibit relative rotation between the ring 118 and the threaded shaft 18 while permitting axial sliding of the ring 118 relative to the threaded shaft 18. An axial end face 174 of the annular member 158 that is axially opposite the teeth 162 can be a flat and smooth surface.

The nut 122 includes a tool engaging portion 178 and a flange 182. The nut 122 is internally threaded to threadably mate with the threaded shaft 18. The tool engaging portion 178 is configured to be gripped by a tool (not shown; e.g., a wrench) to rotate the nut 122. In the example provided, the tool engaging portion 178 is defined by a plurality of flat surfaces that form an overall hexagonal shape, though other configurations can be used. The flange 182 extends radially outward of the tool engaging portion 178. In the example provided, the flange 182 is disposed axially between the ring 118 and the tool engaging portion 178. The flange 182 includes a plurality of protrusions or serrations 186 that extend radially outward to define a perimeter of the flange 182. In the example provided, the serrations 186 extend about the entire circumference of the flange 182, though other configurations can be used. Adjacent serrations 186 are spaced apart by ramp surfaces 190a and 190b that meet at a valley 194. The axial end of the nut 122 that faces the ring 118 can be flat and smooth to slide along the axial end face 174 of the ring 118.

Figure 4:
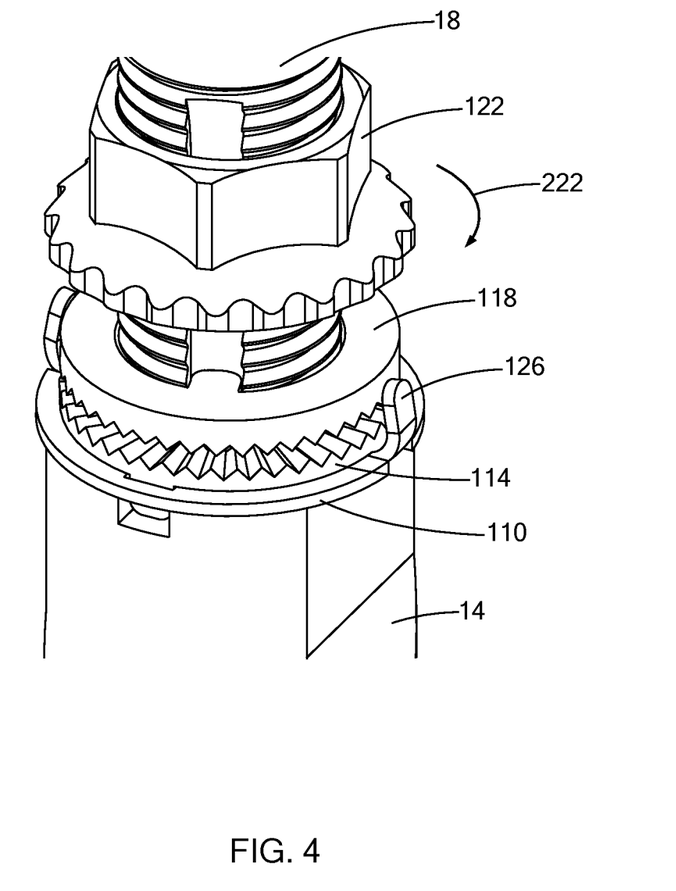
FIG. 4 is a perspective view of the connection of FIG. 2, illustrating the connection in a pre-installed position.

Referring to FIGS. 3 and 4, the nut 122 is threaded onto the threaded shaft 18. The ring 118 is then inserted over the threaded shaft 18 so that the key 166 is within the keyway 74 and the ring 118 slides axially on the threaded shaft 18. The lock element 110 is positioned between the ring 114 and the tube 14 and the protrusions 150 are inserted through the notches 138 of the lock element 110 and into the notches 42 of the tube 14. Engagement surfaces 210 of the protrusions 150 contact engagement surfaces 50 and 54 of the notches 42 and engagement surfaces 214 of the notches 138 to inhibit relative rotation between the ring 114, the lock element 110, and the tube 14.

The threaded shaft 18 is then inserted through the ring 114 and the lock element 110 and threaded into the bore 34. The axial and rotational position of the clevis 26 can be adjusted by rotating the threaded shaft 18 while the teeth 146, 162 are held apart. The teeth 146, 162 provide rotational indexing of the clevis 26. Once the position of the clevis 26 is in the desired location, the ring 118 can be moved so that the teeth 146, 162 are matingly engaged. The nut 122 can be rotated to tighten the ring 118 against the ring 114 prevent disengagement of the teeth 146, 162 to inhibit rotation of the threaded shaft 18.

In the example provided, the tabs 126 extend axially around the rings 114, 118 to be received between serrations 186 of the nut 122. The tabs 126 are formed of a resilient material (e.g., spring steel) that biases the tabs 126 into the valleys 194 of the nut 122. Rotation of the nut 122 causes the tabs 126 to slide along the ramp surfaces 190a, 190b. In the example provided, the tightening rotational direction is shown in FIG. 4 by arrow 222, though other configurations can be used. When the nut 122 is fully tightened, the tabs 126 are positioned between serrations 186 and inhibit unintentional rotation of the nut 122.

In the example provided, the ramp surfaces 190a, 190b are symmetrical. In an alternative construction, not shown, the ramp surfaces 190a, 190b can be asymmetrical, such that more rotational force is needed to loosen the nut 122 than to tighten the nut 122. In other words, the ramp surfaces 190a can have a less steep angle than the ramp surfaces 190b. In one such a construction, not shown, the ramp surfaces 190b can be shoulders that have a 90° angle so that the serrations 186 and tabs 126 act as a ratchet to tighten the nut 122 while inhibiting loosening of the nut 122.

In an alternative construction, not specifically shown, the tabs 126 can extend radially outward so as to not engage the serrations 186 during tightening of the nut 122. In this construction, the tabs 126 can be bent into the valleys 194 after the nut 122 is tightened to a desired amount.

Figure 5:
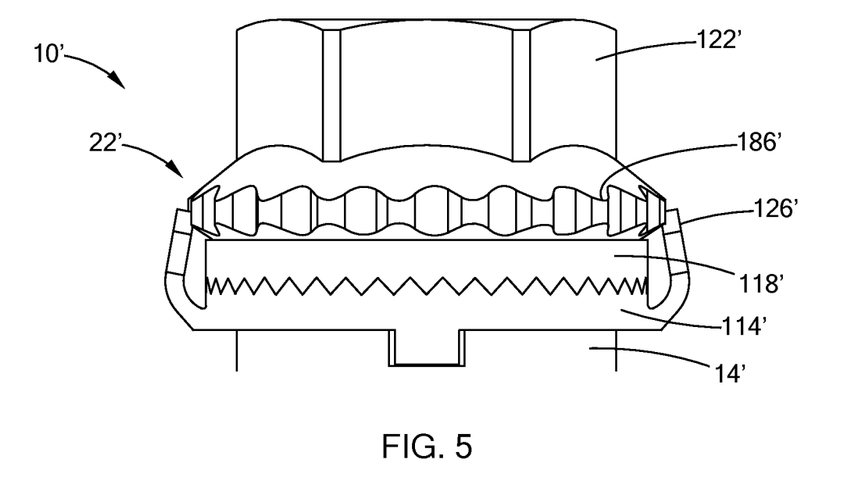
FIG. 5 is a side view of a connection of a rod assembly of a second construction in accordance with the teachings of the present disclosure.

Referring to FIG. 5, a rod assembly 10' of a second construction is illustrated. The rod assembly 10' is similar to the rod assembly 10 except as otherwise shown or described herein. Features denoted with primed reference numerals are similar to their non-primed counterparts except as otherwise shown or described herein. In the example provided, the tabs 126' are integrally formed with the ring 114'. The tabs 126' extend axially from the perimeter of the ring 114' around the ring 118' to be received between the serrations 186'.

Figure 6:
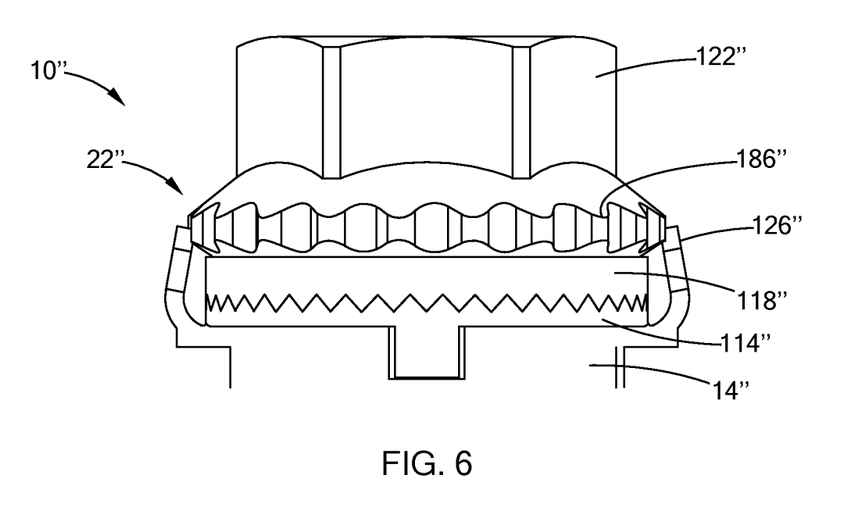
FIG. 6 is a side view of a connection of a rod assembly of a third construction in accordance with the teachings of the present disclosure.

Referring to FIG. 6, a rod assembly 10" of a third construction is illustrated. The rod assembly 10" is similar to the rod assembly 10 except as otherwise shown or described herein. Features denoted with double primed reference numerals are similar to their non-primed counterparts except as otherwise shown or described herein. In the example provided, the tabs 126" are integrally formed with the tube 14". The tabs 126" extend axially from the perimeter of the tube 14" around the rings 114", 118" to be received between the serrations 186".

In an alternative construction, not specifically shown, the tabs 126 can extend axially from a perimeter of the ring 118 to be received between the serrations 186 of the nut 122.

In another alternative construction, not specifically shown, the tube 14 can be replaced with a non-tubular body, such as a plate or other shaped body that defines the bore 34 and notches 42.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A connector assembly comprising:
   a first member;
   a threaded shaft disposed about an axis;
   a nut threadably engaged with the threaded shaft, the nut including a plurality of radially outward extending protrusions;
   a set of axially facing first teeth non-rotatably coupled to the first member;
   a set of second teeth configured to mate with the first teeth, the second teeth being coupled to the threaded shaft for axial movement relative to the threaded shaft and for common rotation with the threaded shaft; and
   a tab that is non-rotatable relative to the first member, the tab overlapping in an axial direction with the set of second teeth and engaging the protrusions to inhibit rotation of the nut relative to the first member.

2. The connector assembly according to claim 1, wherein the first and second teeth form mating crowns that extend circumferentially about the axis.

3. The connector assembly according to claim 1, wherein the nut includes a tool engagement portion and a flange that extends radially outward of the tool engagement portion, the protrusions being disposed about the flange.

4. The connector assembly according to claim 1, wherein the tab is formed of a resilient material and is biased radially inward to slide along ramp surfaces defined between the protrusions.

5. The connector assembly according to claim 4, wherein the ramp surfaces are configured to permit ratcheting of the tab in a tightening direction of the nut while inhibiting the nut from rotating in a loosening direction of the nut.

6. The connector assembly according to claim 1, further comprising:
   a first ring defining the first teeth and a first engagement surface on a side of the first ring that is opposite the first teeth, the first engagement surface engaging a second engagement surface defined by the first member to inhibit relative rotation between the first ring and the first member.

7. The connector assembly according to claim 6, wherein one of the first ring and the first member includes an axial protrusion and the other one of the first ring and the first member defines a notch that receives the axial protrusion to inhibit relative rotation between the first ring and the first member.

8. The connector assembly according to claim 7, further comprising:
   a second ring defining an aperture, the tab extends axially from the second ring, the axial protrusion extending through the aperture and engaging the second engagement surface to inhibit relative rotation between the first ring and the second ring.

9. The connector assembly according to claim 6, wherein the tab extends axially from the first ring.

10. The connector assembly according to claim 1, wherein the tab extends axially from the first member.

11. The connector assembly according to claim 1, further comprising a ring defining the second teeth, the ring being disposed about the threaded shaft and axially between the nut and the first teeth.

12. The connector assembly according to claim 11, wherein the ring includes a radial protrusion, the radial protrusion being received within a slot defined by the threaded shaft to inhibit relative rotation between the ring and the threaded shaft while permitting axial movement therebetween.

13. The connector assembly according to claim 1, further comprising a clevis coupled to an end of the threaded shaft.

14. The connector assembly according to claim 13, wherein the first member is a tube extending along the axis.

15. A rod assembly comprising: a tube member disposed about an axis;
   a shaft defining threads disposed about the axis and defining an axial slot; a nut threadably engaged with the threads of the shaft, the nut including a plurality of serrations disposed about the axis;
   a first ring disposed about the axis and defining a set of first teeth the first ring being non-rotatably coupled to the tube member;
   a second ring disposed about the shaft axially between the nut and the first teeth, the second ring defining a set of second teeth configured to mate with the first teeth, the second ring including a protrusion that extends into the axial slot of the shaft to inhibit relative rotation between the second first ring and the shaft; and
   a tab that is non-rotatable relative to the tube member, the tab extending in an axial direction to overlap the second ring in the axial direction, the tab engaging the serrations to inhibit rotation of the nut relative to the tube member.

16. The rod assembly according to claim 15,
   wherein one of the first ring and the tube member includes a protrusion and the other one of the first ring and the tube member defines a notch that receives the protrusion to inhibit relative rotation between the first ring and the tube member.

17. The rod assembly according to claim 16, further comprising:
   a third ring defining an aperture, the tab extends axially from the third ring, the axial protrusion extending through the aperture and engaging an engagement surface to inhibit relative rotation between the first ring and the third ring.

18. The rod assembly according to claim 16, wherein the tab extends axially from the first ring or the tube member.

19. A connector assembly comprising:
   a first member;
   a threaded shaft disposed about an axis;
   a nut threadably engaged with the threaded shaft, the nut including a plurality of radially outward extending protrusions;
   a set of axially facing first teeth non-rotatably coupled to the first member;
   a ring disposed about the axis and defining a set of second teeth configured to mate with the first teeth, the ring being coupled to the threaded shaft for axial movement relative to the threaded shaft and for common rotation with the threaded shaft; and a tab extending axially from a perimeter of the ring, the tab engaging the protrusions to inhibit rotation of the nut relative to the ring.

20. The connector assembly according to claim 19 further comprising a second ring, the second ring defining the first teeth, wherein one of the second ring and the first member defines a protrusion and the other one of the second ring and the first member defines a notch that receives the protrusion to inhibit relative rotation between the second ring and the first member.

* * * * *